United States Patent
Pidcock et al.

(10) Patent No.: US 9,828,761 B2
(45) Date of Patent: Nov. 28, 2017

(54) BUILDING SYSTEM

(71) Applicant: The trustee for House of Parts Trust, Tempe, NSW (AU)

(72) Inventors: David Pidcock, Tempe (AU); Caroline Pidcock, Tempe (AU)

(73) Assignee: The Trustee for House of Parts Trust, Tempe, NSW (AU)

( * ) Notice: Subject to any disclaimer, the term of this patent is extended or adjusted under 35 U.S.C. 154(b) by 0 days.

(21) Appl. No.: 14/410,919

(22) PCT Filed: Jun. 6, 2013

(86) PCT No.: PCT/AU2013/000604
§ 371 (c)(1),
(2) Date: Dec. 23, 2014

(87) PCT Pub. No.: WO2014/000019
PCT Pub. Date: Jan. 3, 2014

(65) Prior Publication Data
US 2015/0191905 A1  Jul. 9, 2015

(30) Foreign Application Priority Data
Jun. 26, 2012  (AU) ................. 2012902712

(51) Int. Cl.
*E04B 1/343* (2006.01)
*E04C 2/38* (2006.01)
(Continued)

(52) U.S. Cl.
CPC ............ *E04B 1/34315* (2013.01); *E04B 1/24* (2013.01); *E04B 1/34326* (2013.01);
(Continued)

(58) Field of Classification Search
CPC ..... E04B 2001/2475; E04B 2001/2451; E04B 2001/2466; E04B 2001/2481;
(Continued)

(56) References Cited

U.S. PATENT DOCUMENTS 3,715,849 A * 2/1973 Strassle .................... E04B 1/24
52/646
5,289,665 A   3/1994 Higgins
(Continued)

FOREIGN PATENT DOCUMENTS

EP   2365145 A1   9/2011
GB   1152323 A    5/1969
(Continued)

OTHER PUBLICATIONS

International Search Report for PCT/AU2013/000604 dated Sep. 3, 2013, ten pages.
(Continued)

*Primary Examiner* — Jessica Laux
(74) *Attorney, Agent, or Firm* — Kilpatrick Townsend & Stockton LLP

(57) ABSTRACT

A building system that includes a modular panel with side members, at least one of the side members having an associated coupling for hooked connection with a corresponding shaped fixture of an adjacent structure, the coupling and fixture being adapted to be held together by a locking device that, when engaged, acts to lock the structure and the side member together and, when disengaged, allows for play between the panel and structure in order to free the panel from the structure.

19 Claims, 23 Drawing Sheets

(51) Int. Cl.
*E04B 1/24* (2006.01)
*E04B 1/61* (2006.01)
*E04B 5/10* (2006.01)
*E04C 3/08* (2006.01)
*E04B 7/04* (2006.01)
*E04C 2/296* (2006.01)
*E04C 2/36* (2006.01)
*E04C 2/52* (2006.01)
*E04B 5/04* (2006.01)
*E04B 7/00* (2006.01)
*E04B 1/18* (2006.01)
*E04C 3/04* (2006.01)
*E04B 1/00* (2006.01)
*F16B 5/00* (2006.01)

(52) U.S. Cl.
CPC ........ *E04B 1/34384* (2013.01); *E04B 1/6162* (2013.01); *E04B 1/6179* (2013.01); *E04B 5/04* (2013.01); *E04B 5/10* (2013.01); *E04B 7/00* (2013.01); *E04B 7/04* (2013.01); *E04C 2/296* (2013.01); *E04C 2/36* (2013.01); *E04C 2/38* (2013.01); *E04C 2/521* (2013.01); *E04C 3/08* (2013.01); *E04B 1/185* (2013.01); *E04B 2001/0076* (2013.01); *E04B 2001/2409* (2013.01); *E04B 2001/2433* (2013.01); *E04B 2001/2451* (2013.01); *E04B 2001/2457* (2013.01); *E04B 2001/2466* (2013.01); *E04B 2001/2475* (2013.01); *E04B 2001/2481* (2013.01); *E04B 2001/34389* (2013.01); *E04C 2003/0421* (2013.01); *E04C 2003/0439* (2013.01); *E04C 2003/0465* (2013.01); *F16B 5/0076* (2013.01)

(58) Field of Classification Search
CPC ..... E04B 2001/2433; E04B 2001/2457; E04B 2001/2409; E04B 1/34315; E04B 1/34326; E04B 1/34384; E04B 1/24; E04B 1/6162; E04B 1/6179; E04B 1/185; E04B 5/04; E04B 5/10; E04B 7/00; E04B 7/04; E04C 2/296; E04C 2/36; E04C 2/521; E04C 2/38; E04C 3/08; E04C 2003/0439; E04C 2003/0465; E04C 2003/0421

See application file for complete search history.

(56) References Cited

U.S. PATENT DOCUMENTS

| | | | |
|---|---|---|---|
| 6,170,217 B1 | 1/2001 | Meyer | |
| 6,230,459 B1* | 5/2001 | Jeffers | E04B 2/7433 52/239 |
| 7,127,862 B2* | 10/2006 | Saldana | E04B 1/2403 52/481.1 |
| 2003/0070377 A1 | 4/2003 | Waalkes et al. | |
| 2004/0074178 A1 | 4/2004 | Daudet et al. | |
| 2008/0302036 A1* | 12/2008 | McMahon | E04B 1/0046 52/284 |

FOREIGN PATENT DOCUMENTS

WO WO2002/055810 A1 7/2002
WO WO2012/162654 A1 11/2012

OTHER PUBLICATIONS

Written Opinion of the International Searching Authority for PCT/AU2013/000604 dated Sep. 3, 2013, eleven pages.
International Preliminary Report on Patentability for PCT/AU2013/000604 dated May 2, 2014, six pages.

* cited by examiner

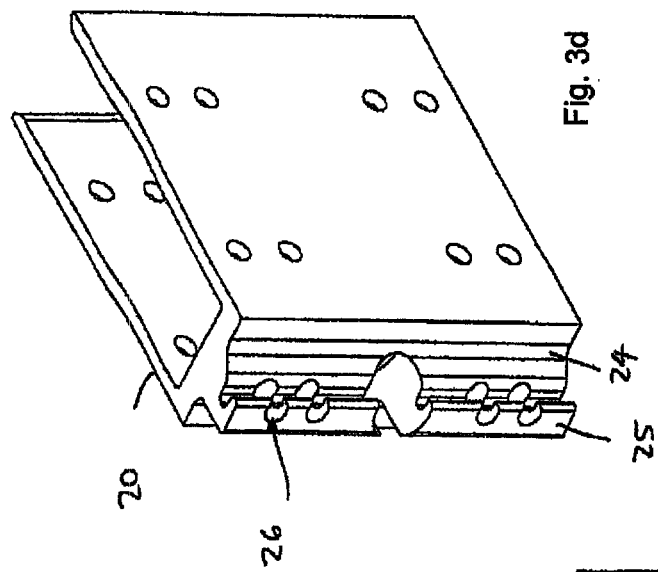
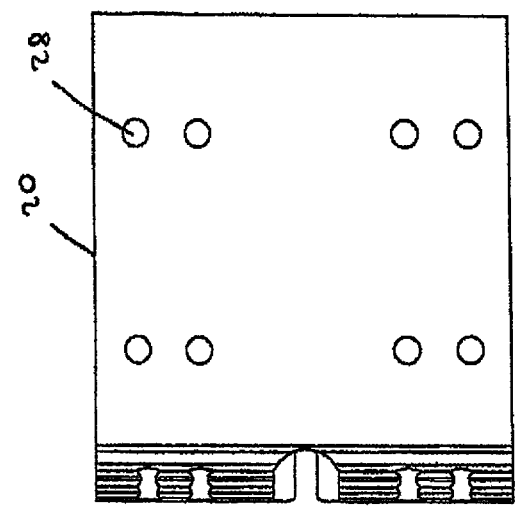
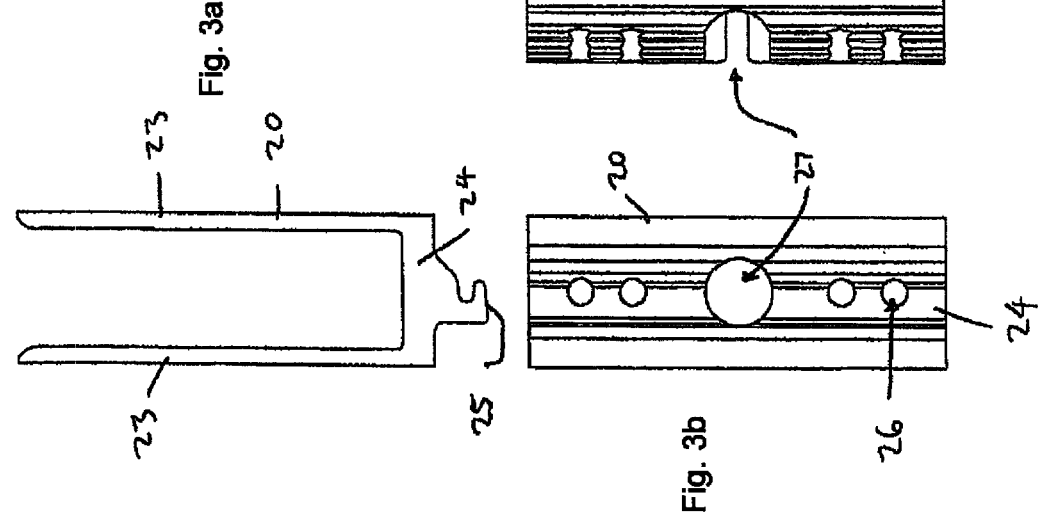

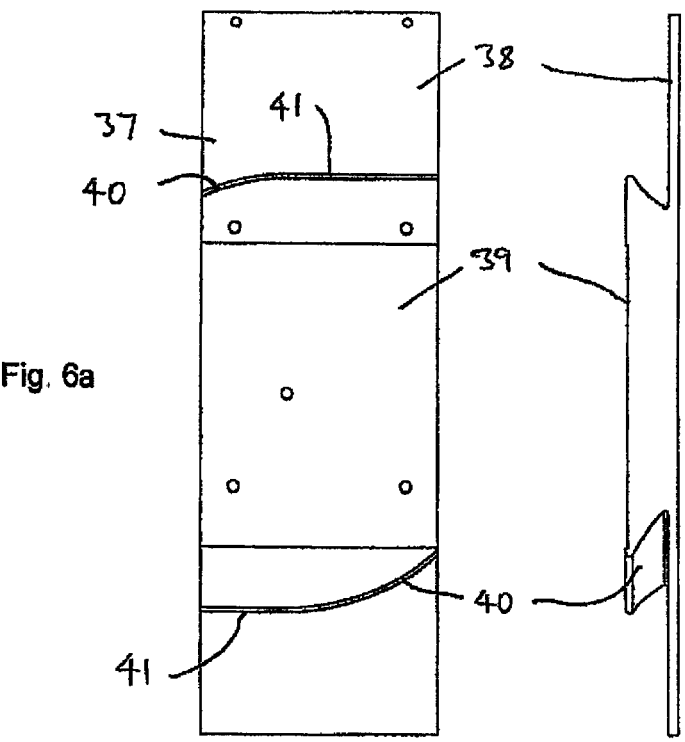
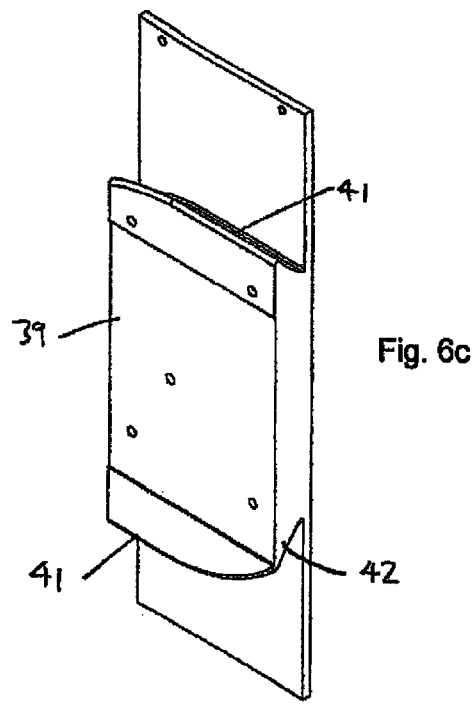

BUILDING SYSTEM

FIELD OF THE INVENTION

The present invention relates to a building system particularly but not exclusively for a modular building.

OBJECT OF THE INVENTION

The invention seeks to provide a building system that is easy to construct and assemble.

SUMMARY OF THE INVENTION

In one broad form, there is provided a building system that includes a modular panel with side members, at least one of the side members having an associated coupling for hooked connection with a corresponding shaped fixture of an adjacent structure, the coupling and fixture being adapted to be held together by a locking device that, when engaged, acts to lock the structure and the side member together and, when disengaged, allows for play between the panel and structure in order to free the panel from the structure.

Preferably, the coupling is configured to separate from the hooked connection with the fixture by action of pivoting the frame relative to the structure.

Preferably, the panel includes a frame formed by a head, the two side members and a footing, with voids defined in the side members and footing and a removable cover being fitted over the void in the footing. Preferably, the voids are interconnected by through holes to allow passage of a conduit such as a water pipe, or electrical cabling or the like.

Preferably, the panel is in the form of a wall panel formed with internal compartments for receipt of insulation material and/or conduits.

Preferably, both side members are provided with couplings for connection with corresponding structure either side of the frame.

Preferably, the side members are configured to define a gap between the frame and adjacent structure to accommodate fittings arranged to project from the panel assembly.

Preferably, the gap is designed to receive a strip of material to seal the gap when the lock devices are in place and engaged.

Preferably, the system includes multiple panels and supporting posts, each panel having respective side members with associated couplings and being interconnected with adjacent structure in the form of either an adjacent panel or an adjacent post, wherein the panels are adapted to be individually installed or removed independently of an adjacent panel or post.

Preferably, the panels are a combination of one or more of a wall panel, a door panel, a window panel or a louver panel.

Preferably, the system includes a floor assembly and a roof assembly, as described below.

In one broad form, there is provided a floor assembly formed of a series of legs interconnected with bearers, the ends of each bearer being coupled relative to an associated leg by a bracket that is fixed to the post base supported by the respective leg, wherein the bearers are formed with an open box section and each bracket has a coupling for hooked connection with a complimentary fixture of the base.

Preferably, the bearers have a cut-away at each end that allows the bearer to be lowered over the associated bracket in a position suitable for pre-formed holes in the bearer and bracket to register, for receipt of fasteners.

Preferably, the floor assembly includes a series of joists extending between two of the bearers, an end of each joist being connected to the respective bearer by and end attachment, wherein the end attachment includes a cam plate that is installed by being rotated into the box section of the bearer until the plate is locked to the bearer, behind a top and bottom flange of the open box section.

Preferably, the bearers have a timber insert fitted to a top of the open box section. Preferably, the end attachments are fixed to the timber insert by fasteners.

Preferably, the floor assembly includes a floor surface that is mounted on top of the joists and bearers and secured to the timber inserts.

In another broad form, there is provided a roof assembly including a series of posts interconnected with beams, the ends of each beam being attached to an associated post by a bracket that is fixed to the respective post, wherein the beams are formed with an open box structure to receive conduits or the like and each bracket is formed with an opening in communication with an aligned aperture in the associated post to allow the conduits or the like to pass between the box section and an interior of the column.

Preferably, each bracket has a coupling for hooked connection with a complimentary fixture of the column.

Preferably, the beams have a cut-away at each end that allows the beams to be lowered over the associated bracket in a position suitable for pre-formed holes in the beam and brackets to register, for receipt of fasteners.

Preferably, the beams have a timber insert fitted to a top of the open box section.

Preferably, the roof assembly includes a roof structure mounted on top of the beams.

BRIEF DESCRIPTION OF THE DRAWINGS

The invention is described, by way of non-limiting example only, with reference to the accompanying drawings, in which:

FIG. 3a is a plan view of a bracket;

FIG. 3b is a front view of the bracket;

FIG. 3c is a side view of the bracket;

FIG. 3d is a perspective view of the bracket;

FIG. 6a is a rear view of an attachment;

FIG. 6b is a side view of the attachment;

FIG. 6c is a rear perspective view of the attachment;

DETAILED DESCRIPTION OF THE INVENTION

Figure 1:
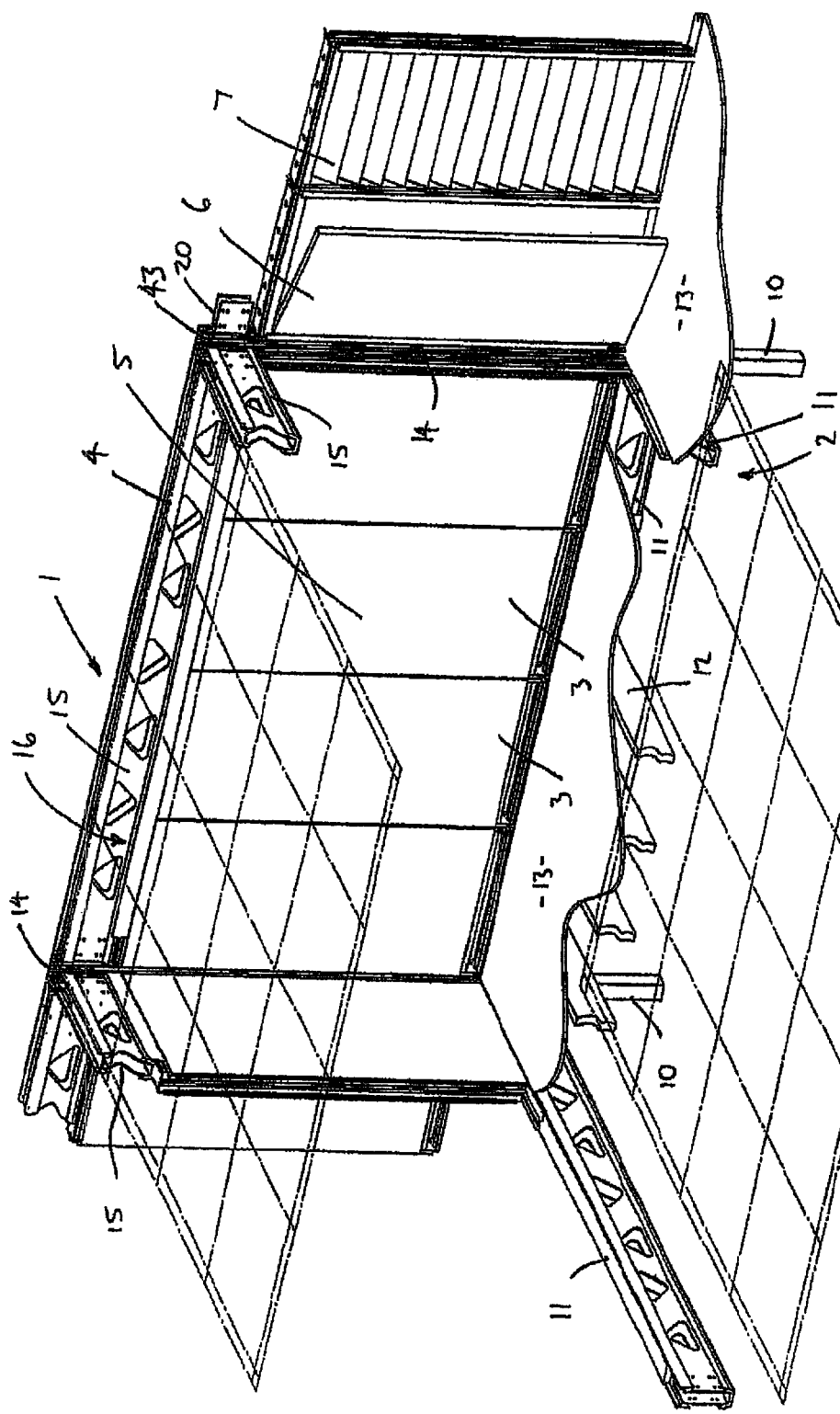
FIG. 1 is a partial perspective view of a construction apparatus.

Referring firstly to FIG. 1, a building assembly 1 is shown as including a floor assembly 2, modular panels 3 and a roof assembly 4. The illustrated panels 3 are in the form wall panels 5, a door panel 6 or a louver window panel 7 although any other combination of those panels or other suitable designed panels may be accommodated.

The floor assembly 2 is formed of a series of legs 10 with interconnecting bearers 11 and joists 12, on which a floor surface 13 is mounted. The legs 10 support posts 14 that extend up to the roof assembly 4, to support roof beams 15 that in turn support a roof 16 or an overhead floor.

The legs 10 preferably have height adjustable base plates (not shown) that allow the legs to be positioned on top of prepared foundations and then adjusted for appropriate levelling. The base plates may be predrilled to accept chemical anchors which will be installed at a later stage to set the legs relative to the foundations.

A bracket 20 (as described in more detail in FIG. 3) is show projecting from one of the posts 14 and this form of bracket is used to interconnect all of the beams 15 and bearers 11 to the respective posts 14.

Figure 2:
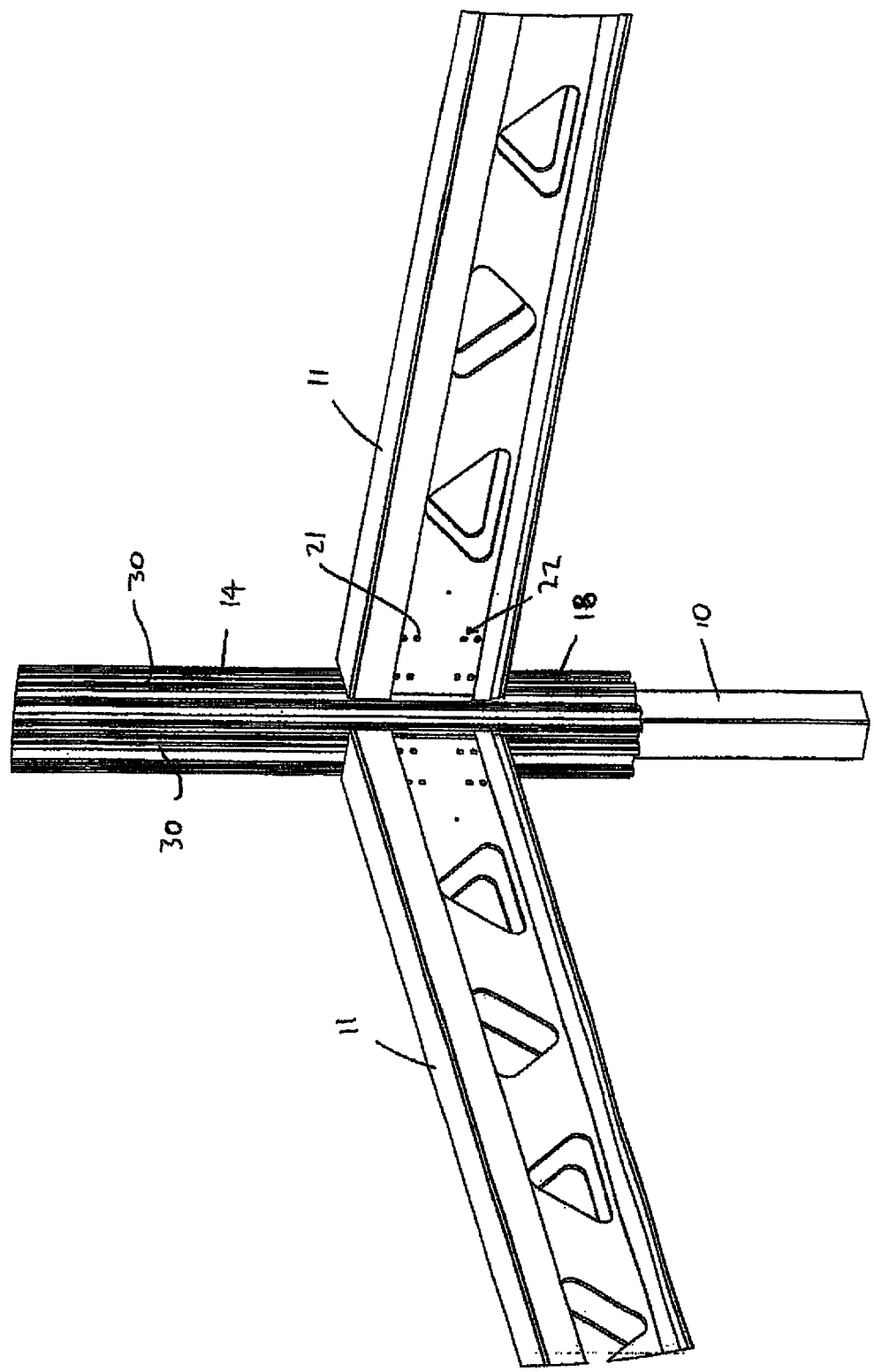
FIG. 2 is a perspective view of a leg and post base with attached bearers.

Referring now to FIG. 2, one of the legs 10 is shown as supporting a base 18 of the associated post 14. Alternatively, the base 18 may be in the form of a sleeve that is joined to the post 14 above. In either case, the base 18 has bearers 11 connected thereto by fasteners 21 that pass through preformed holes 22 that align with holes in an underlying bracket 20.

The connecting bracket 20 is illustrated in FIG. 3. FIG. 3a shows a plan view of the bracket 20, which is U-shaped and has two parallel blades 23 and a bridging section 24 with a hook shaped coupling 25 to connect with a corresponding fixture 30 on the post 14. In FIG. 3b, the bridging section 24 is shown as including mounting apertures 26 and a central opening 27. In FIG. 3c, the blades 23 are illustrated as having an array of holes 28 that match the holes 22 in the bearers 11. FIG. 3d shows a perspective view of the bracket 20. As can be seen, the mounting apertures 26 pass through the bridging section 24 and the coupling 25 as well.

In use, the mounting bracket 20 is mounted to the post by hooking the coupling 25 into the fixture 30. The bracket 20 may then be secured in place by way of bolts that are fixed through the mounting apertures 26.

Figure 4C:
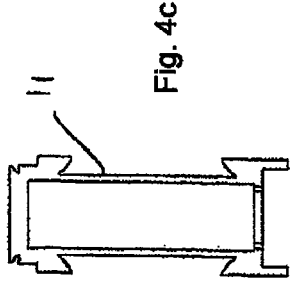
FIG. 4c is an end view of the bearer.
Figure 4D:
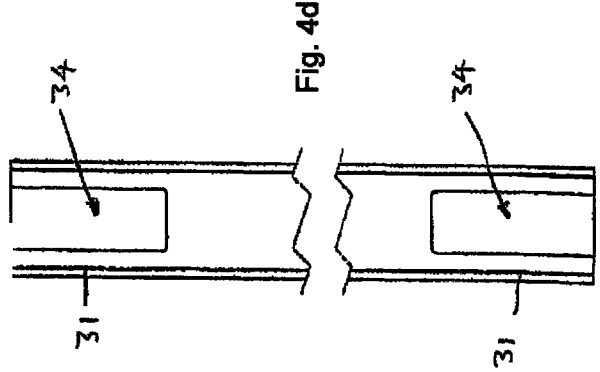
FIG. 4d is a bottom view of the bearer.
Figure 4A:
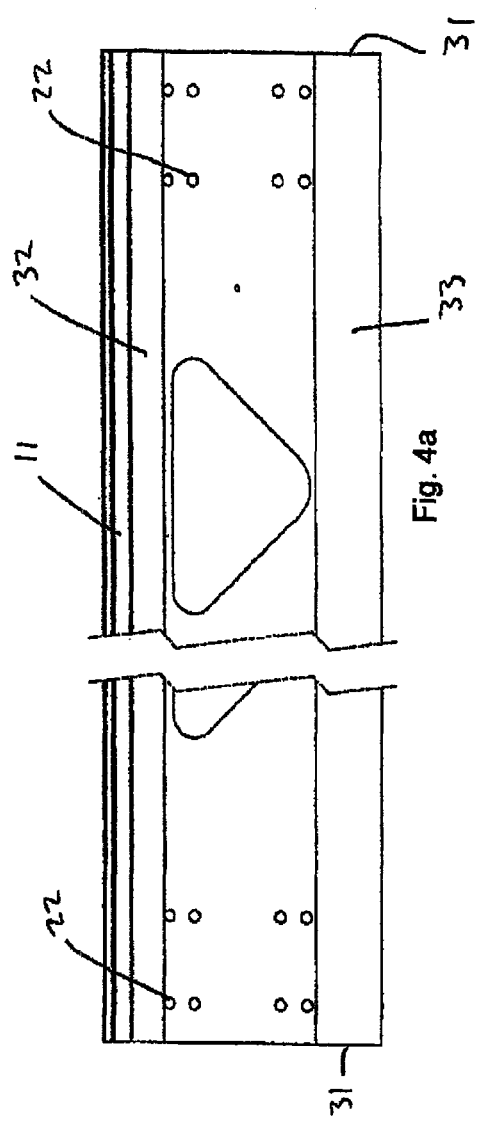
FIG. 4a is a side view of a bearer.
Figure 4B:
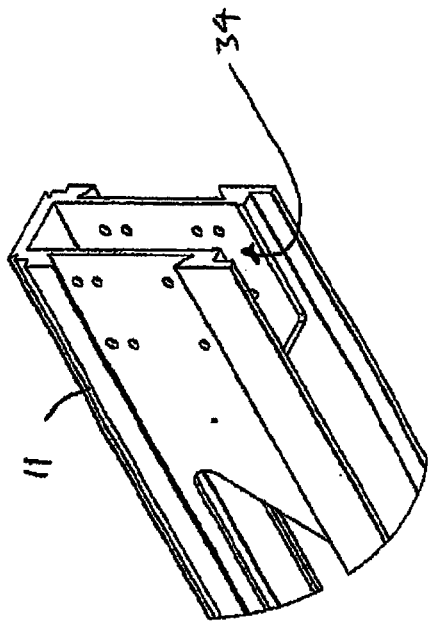
FIG. 4b is a partial perspective view of the bearer.

With regard to FIG. 4a, the bearer 11, has a composite box section which is shown in side profile. The connecting holes 22 are provided at either end 31. Top and bottom flanges 32, 33 extend along the length of the bearer 11. In FIG. 4b, the bearer 11 is shown as having an open box section with a cut out 34 at the end 31. FIG. 4c is an end view that illustrates the open box section is a constant profile throughout the length of the bearer 11, while FIG. 4d shows cut outs 34 are formed in both ends 31 of the bearer 11.

The cut out 34 at the end 31 of the bearer 11 allows the bearer 11 to be lowered on to the associated bracket 20 and be supported in place while the fasteners are used to secure the bearer 11 to the bracket 20.

Figure 5:
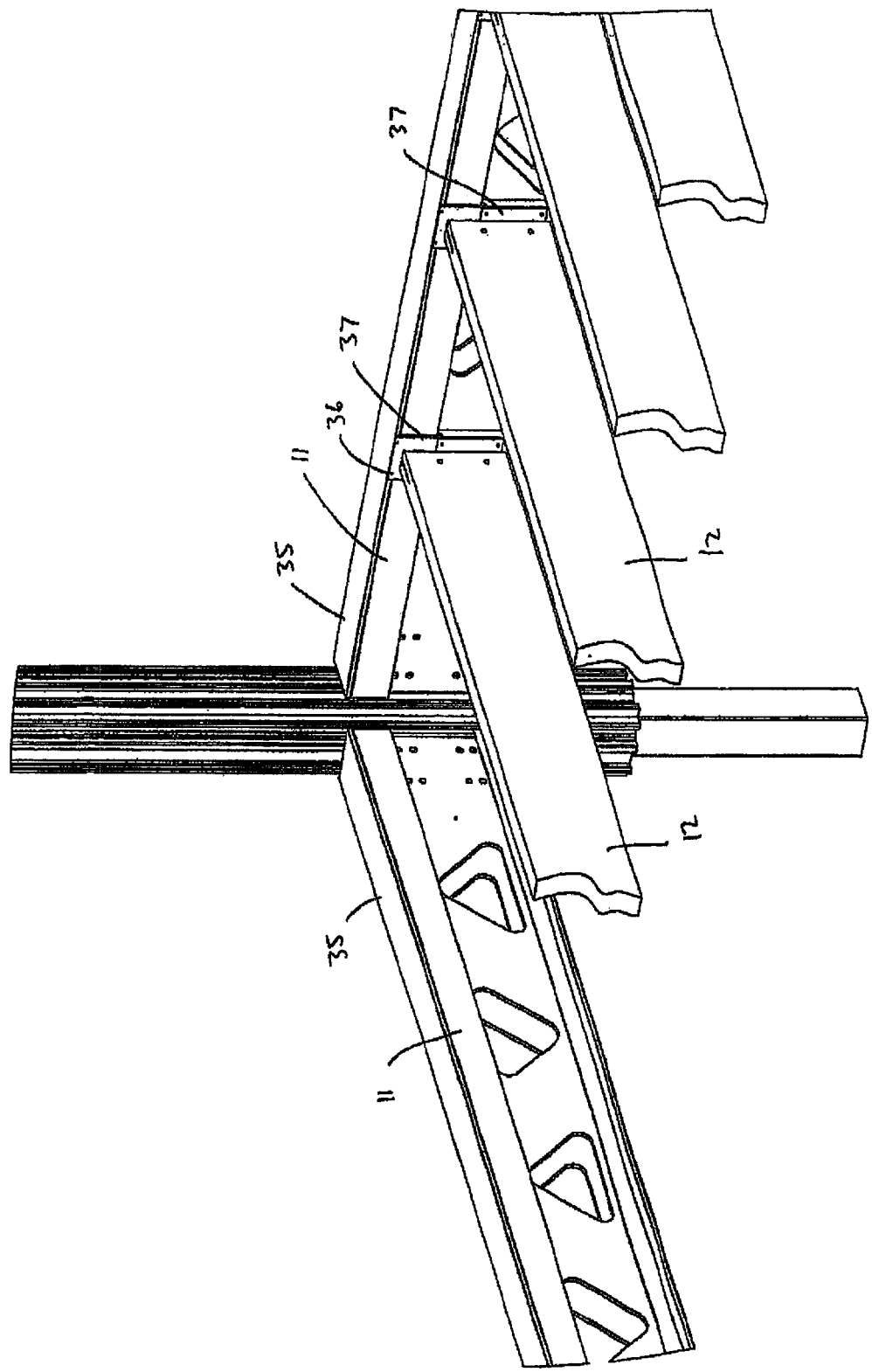
FIG. 5 is a perspective view of the post base with attached bearers and joists.

Referring now to FIG. 5, timber inserts 35 are fitted to the top of the bearers 11 and additional fasteners 36 are used to fix attachments 37 to the timber insert 35 to provide a mounting for respective timber joists 12, which are in turn attached to the attachments 37 via screws.

If a wet area is to be provided, the floor joists 12 at the wet area are at a lower level than the rest of the floor joists to allow for a drop down bathroom floor (not shown) to be installed.

A rear view of one of the attachments 37 is shown in FIG. 6a and FIG. 6b. The attachment 37 has a main plate 38 and a cam plate 39 with two diametrically opposed curved surfaces 40 and adjoining flat surfaces 41. In the perspective view of FIG. 6c, the cam plate 39 can be seen as having a flared profile 42. In use of the attachment 37, the flared profile 42 is inserted into the bearer 11 in a sideways orientation and rotated so that the curved surfaces 40 engage a rear side of the upper and lower flanges 32, 33, respectively, until the flat surfaces 41 connect with the flanges 32, 33. Further rotation is prevented by way of the engagement of the flat surfaces 41 with the flanges 32, 33, at which time the fasteners can be employed to fix the attachment in place. The illustrated attachment is rotated into the locked position by rotating the attachment 37 in a clockwise direction, facing the bearer 11. A second attachment will be used to attach the joist 12 to an opposite bearer and that second attachment will also be rotated clockwise to mount the attachment to the opposite bearer. This has the result that the two attachments at each end of the joist 12 acting against each other to further prevent accidental unlocking rotation once the attachments are installed.

Referring back to FIG. 1, the beams 15 are shown connected to an upper end 43 of the posts 14. The beams 15, like the bearers 11 are also mounted on associated brackets 20 via fasteners that connect the beams 15 to the underlying brackets 20 at a height of about 2.7 meters above the floor assembly 2. If the posts 14 continue higher than 2.7 meters, a second bracket may be attached further up. The beams 15 also have cut outs that allow the beams 15 to be positioned on the associated bracket 20 while fasteners secure the beam 15 in place. The alignment of the central opening 27 with an aperture formed in the post 14 provides an access way for conduits (not shown), such as electrical cabling or the like, to pass freely through the opening between the beam 15 and the inside of the post 14. As such, conduits can be run up and down the beams 15, in the void defined by the open box section of the beam, as well internally of the post 14, as required. A removable side cover plate may be provided to close the void of the beam.

Figure 7:
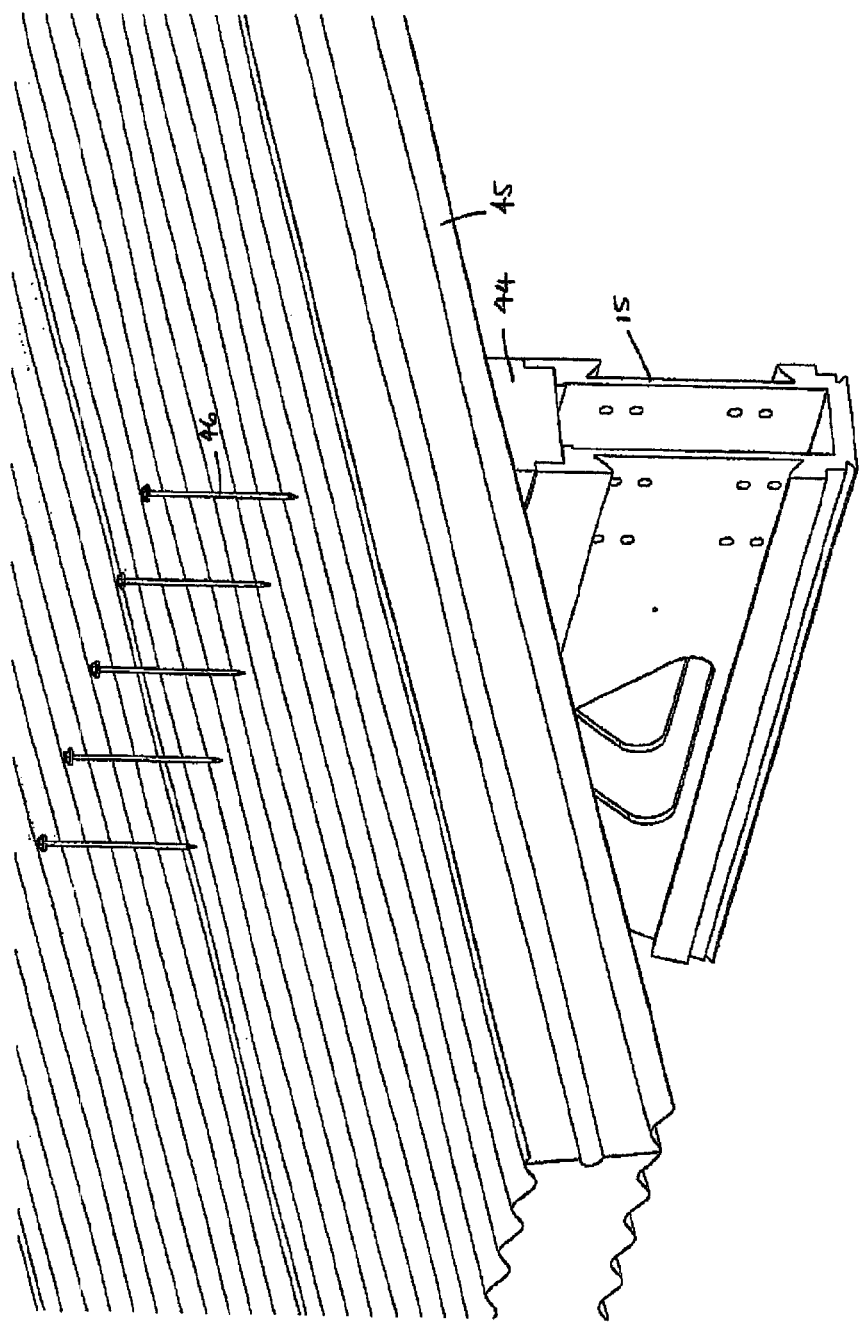
FIG. 7 is a perspective view of a roof structure and supporting beam.

A timber insert 44 is fitted to the top of each beam 15, as shown in FIG. 7, and this supports a roof structure 45 that can be secured to the beam 15 by nails 46. The roof structure 45 can be prefabricated and formed of a composite material such as an insulating material, if required. The roof structure 45 may be fixed with proprietary fixings and proprietary seals and finished using proprietary flashing trims and gutters. If the design of the system 1 includes a sloping skillion roof, sloping composite panels making up the sloping section can instead be fitted to the timber inserts 44 of the beams 15 to form the slope of the roof. These sloping composite panels will have a channel shape in the top edge which allows for the fitting of the timber inserts 44 similar to the ones fitted to the beam 15.

Figure 8A:
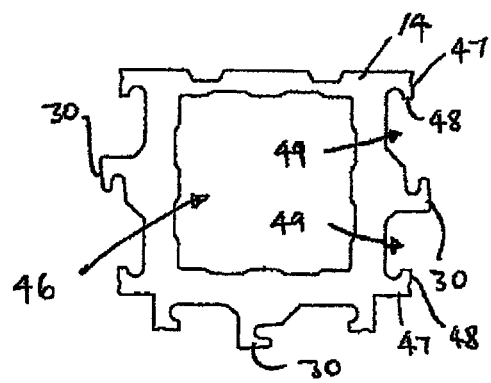
FIG. 8a is a plan view of the post.
Figure 8B:
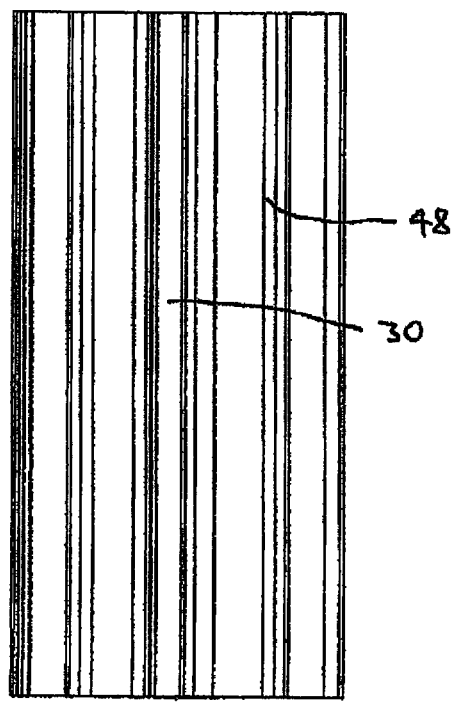
FIGS. 8b and 8c are side views of the post.
Figure 8C:
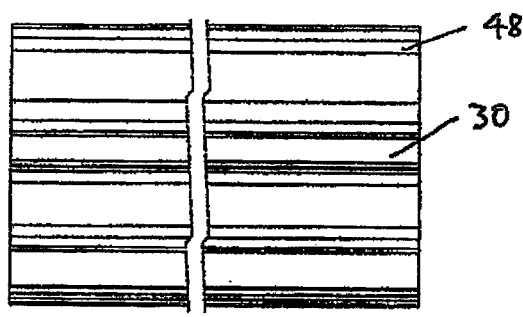
Figure 8D:
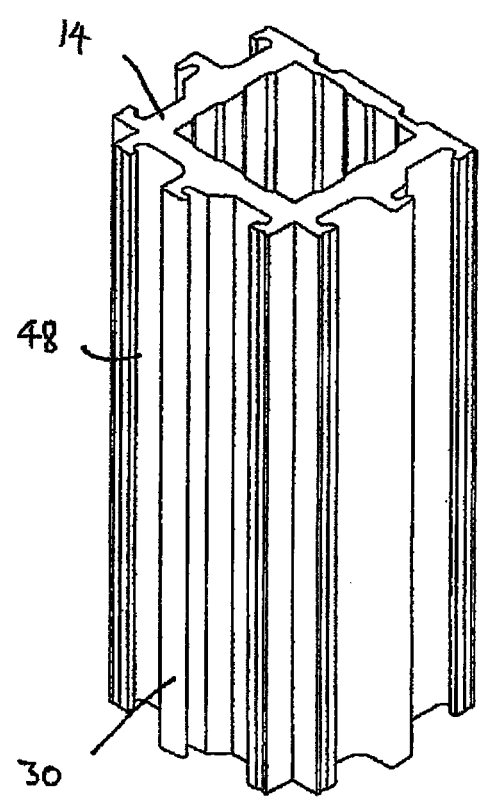
FIG. 8d is a perspective view of the post.

Referring now to FIG. 8a, the post 14 is shown with a central void 46 and multiple fixtures 30 around a periphery. The fixtures 30 have a hook shape to match the configuration of the couplings 25. In this example, the post 14 provides three adjacent fixtures 30 at right angles to each other. However, the post 14 may be formed with a fourth fixture, if required, of alternatively fewer fixtures. The post also has lateral projections 47 either side of the fixture 30, with return edges 48 facing back toward the respective fixture 30 so as to define voids 49. As seen in FIGS. 8b to 8d, the edges 48 and fixtures 30 extend the length of the post.

Figure 9:
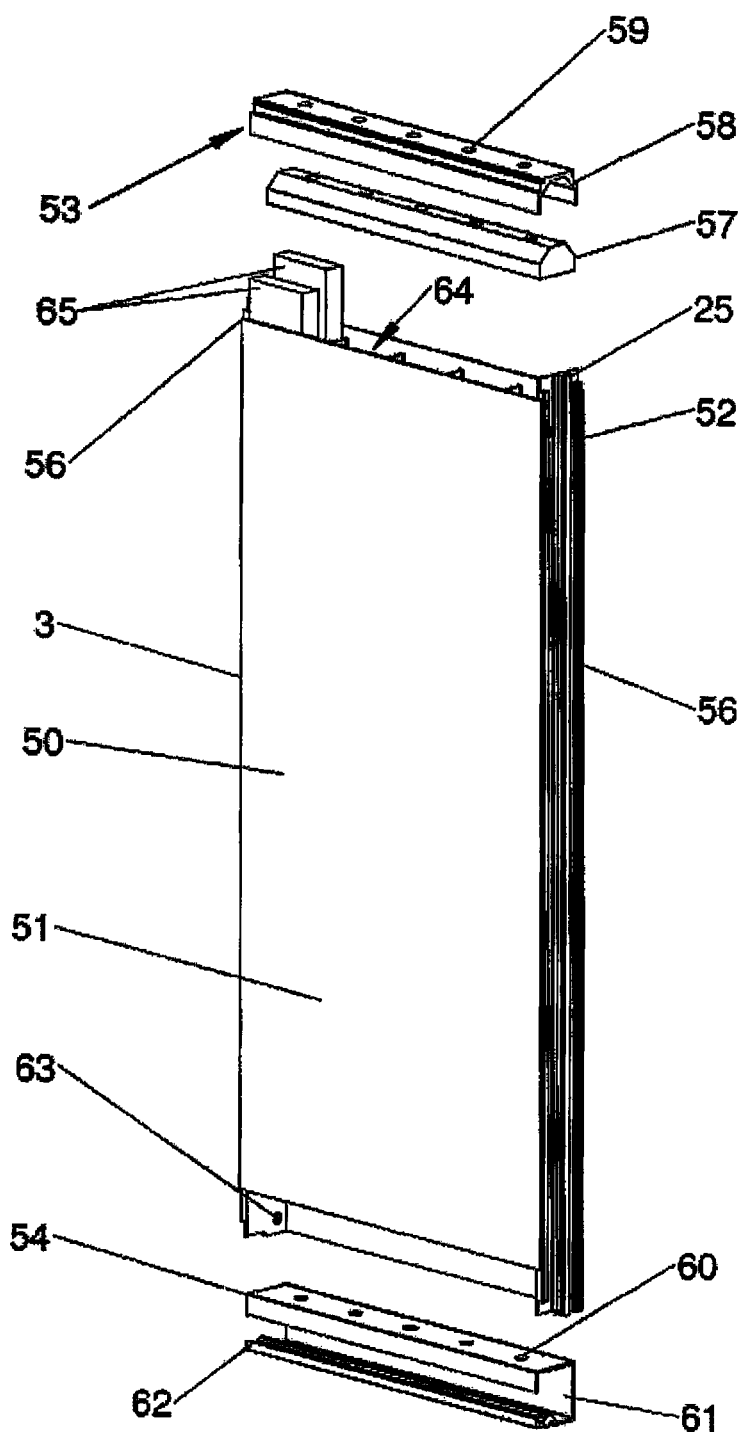
FIG. 9 is an exploded view of a modular panel.

Referring now to FIG. 9, a modular panel 3 is illustrated in the form of a wall panel 50 with a main body 51 within a frame 52, which is formed by a head 53, a skirting footing 54 and interconnecting side members 56. Each side member 56 has a coupling 25 that extends down the length of the side member 56. The head 53 is formed of an inner and outer shell 57, 58 that connect across the top of the panel 50. A series of openings 59 are provided along the length of the head 53 and these align with corresponding openings 60 in the footing 54. The openings 59, 60 allow conduits in the form of electrical wiring or reticulation piping (not shown) to run through the head 53, internally of the panel 50 and into the footing 54.

The footing 54 is in the form of an open channel 61 that defines a void 62 to receive the conduits and allow them to pass through an opening 63 in the side member 56, for passage into an adjacent structure such as an adjacent panel assembly. A skirting cover plate may be fitted over the channel 61 in order to close the void 62.

The main body 51 of the panel 50 is divided into a five equal sized compartments 64 and each compartment 64 is adapted to carry conduits such as piping or cabling though the panel 50 and to receive insulation 65 with an air gap/access way therebetween to enhance the thermal characteristics of the panel 50.

Figure 10:
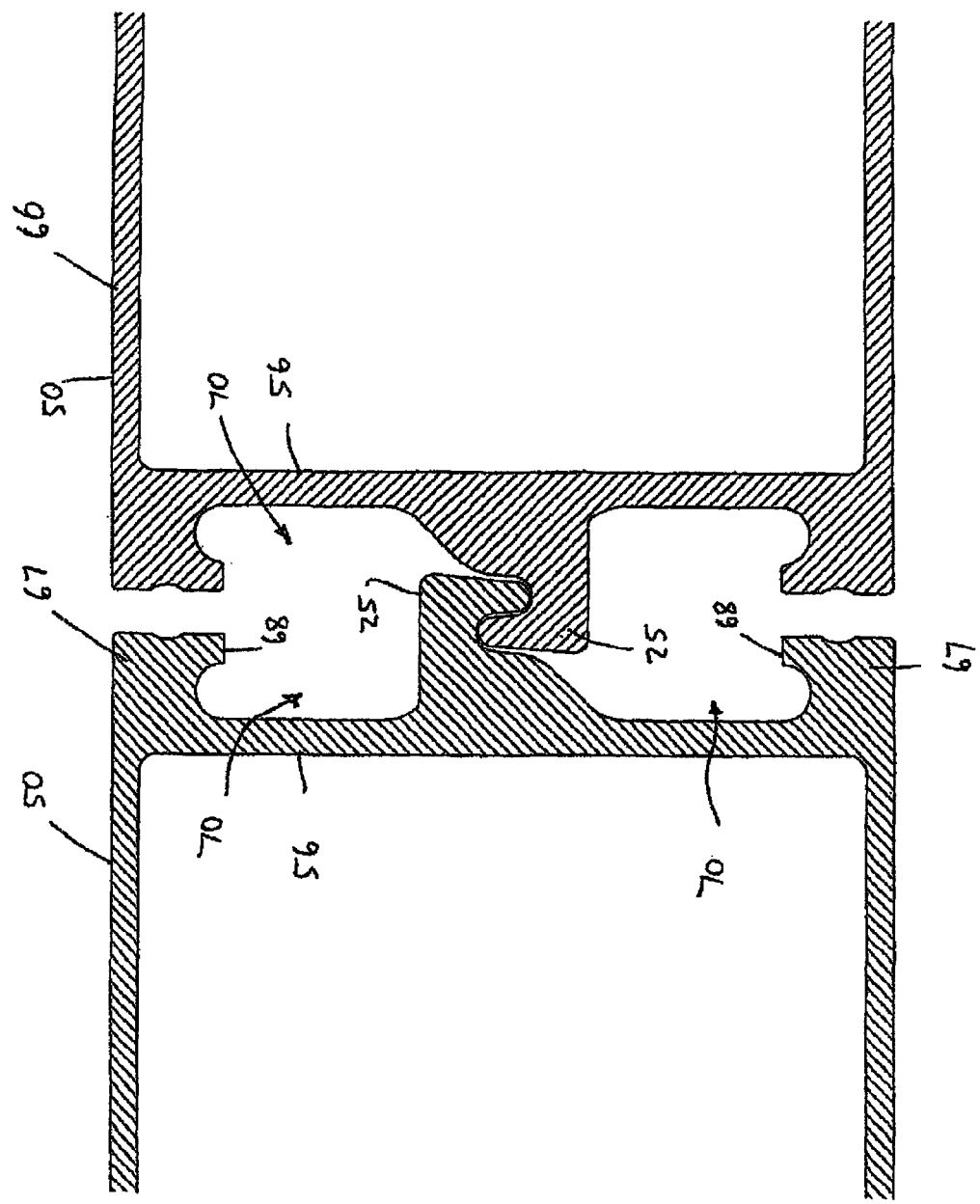
FIG. 10 is a sectioned view illustrating a connection between two panels.

Referring now to FIG. 10, the panel 50 is shown connected to an adjacent structure 66 in the form of another modular panel 50, by way of the respective couplings 25 being interconnected in a hooked relation. It should be noted the side member 56 of each frame 52 has the coupling 25 arranged centrally of the side member 56, with voids 70 defined either side of the coupling by a projection 67 that has a return edge 68 facing the coupling 25. It should be noted the configuration of the coupling 25 and projections 67 associated with each side member 56 is the same as provided on the post, as described above. Accordingly, the adjoining structure could instead be the post 14 and the coupling 25 would then connect with the fixture 30 of the post.

Figure 11:
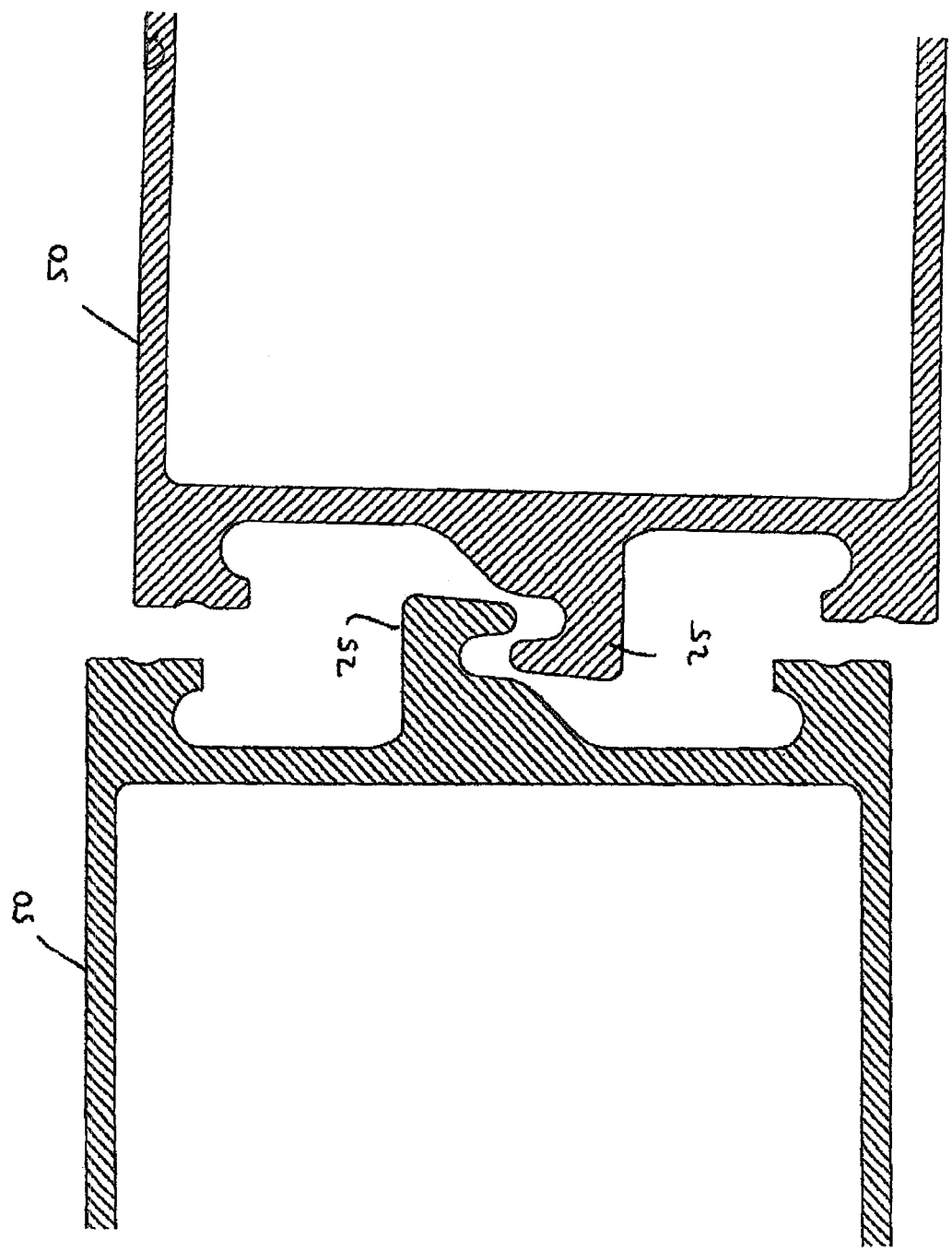
FIG. 11 illustrates the separation of the panels.
Figure 12:
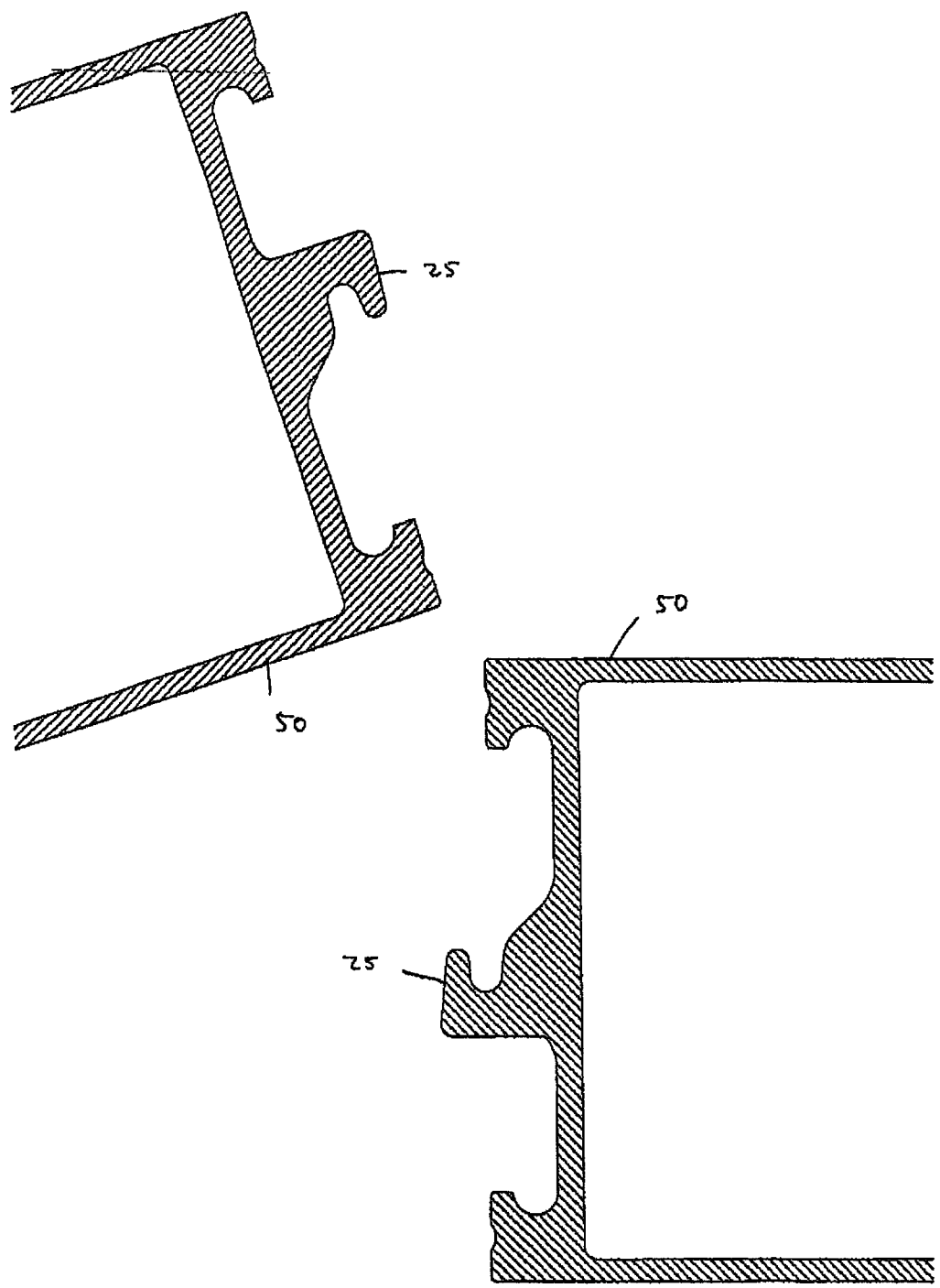
FIG. 12 illustrates one of the panels being freed from the other panel.

In order to separate the panels 50, one of the panels 50 is pivoted relative to the other, to disconnect the couplings 25, as illustrated in FIG. 11. Further rotation of one of the panels, to a relative location shown in FIG. 12, allows the panels 50 to be freed from each other.

Figure 13:
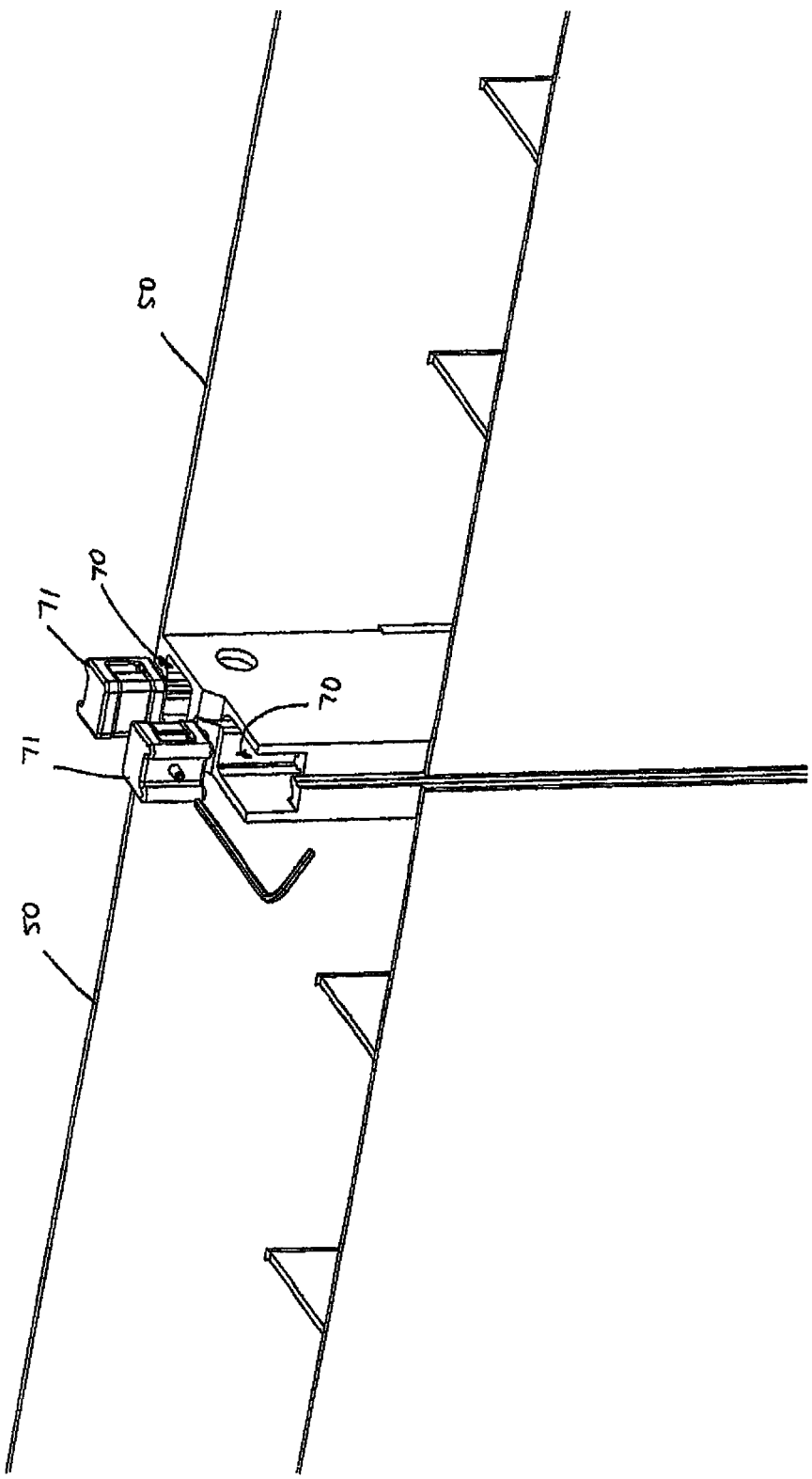
FIG. 13 is a perspective view illustrating the insertion of the devices used to lock the panels together.
Figure 14:
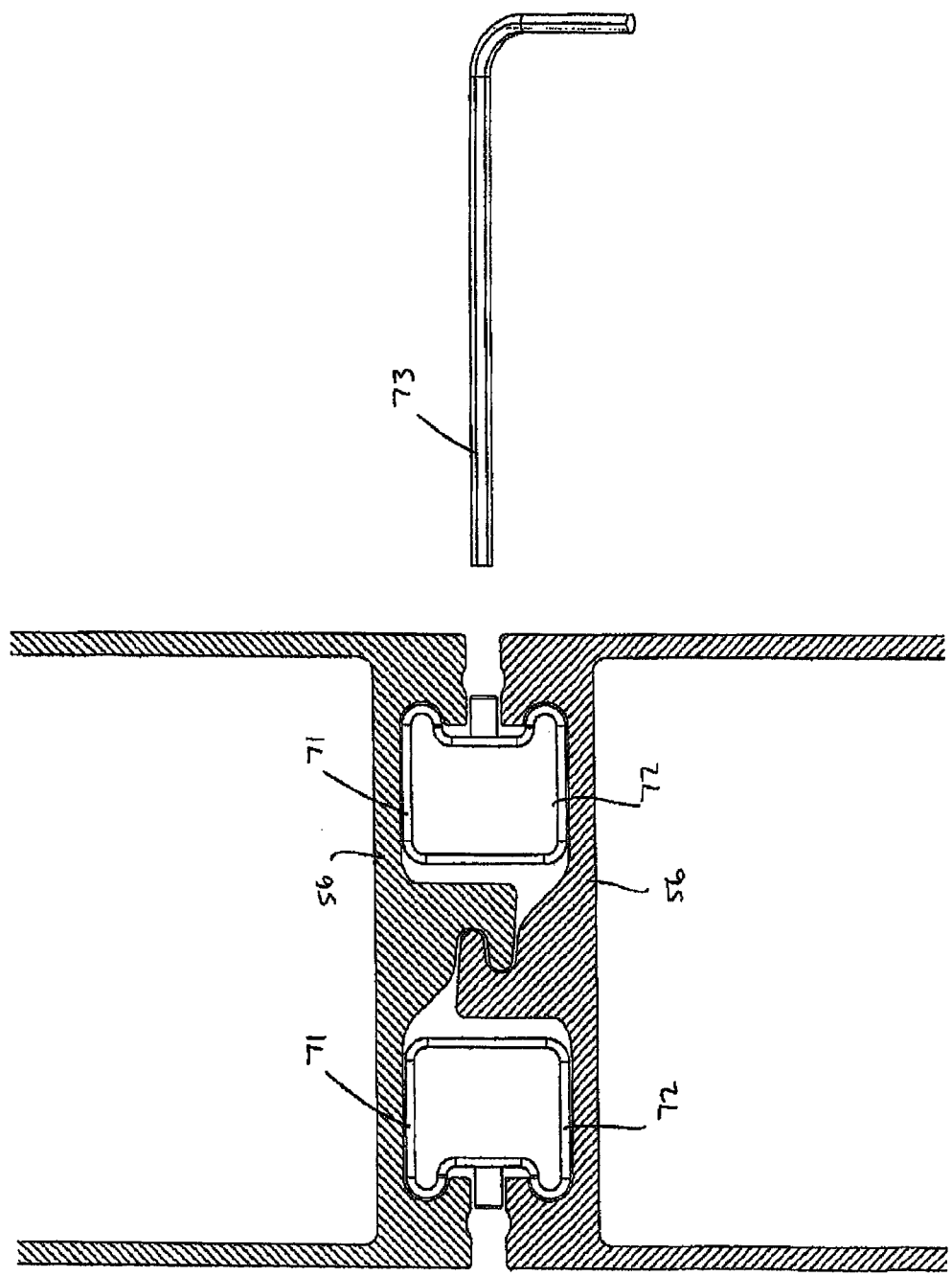
FIG. 14 illustrates the installed locking devices.

When the panels 50 are closed together such that the couplings 25 interconnect, locking devices 71, as shown in FIG. 13, can be dropped into the voids 70 defined between the two panels 50. As shown in FIG. 14, the devices 71 are in the form of expansion pieces 72 that are engaged by a key 73, to push against the side members 56 and force the couplings 25 to lock together.

Figure 15B:
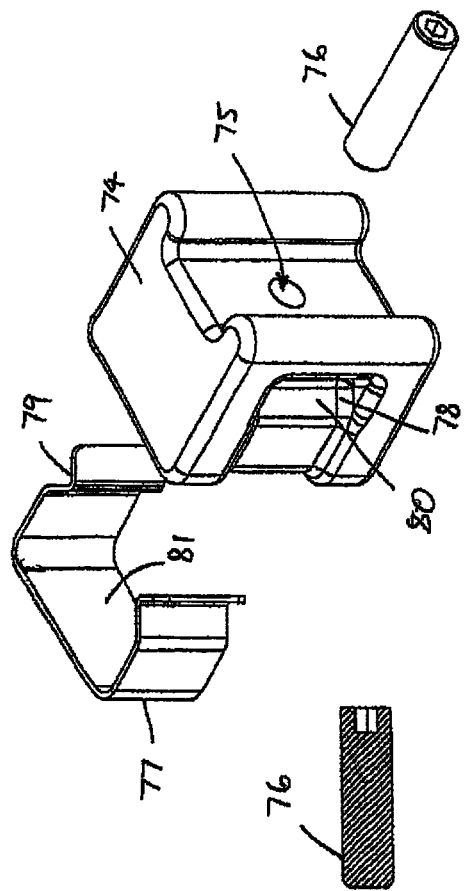
FIG. 15b is a perspective view of the locking device.
Figure 15A:
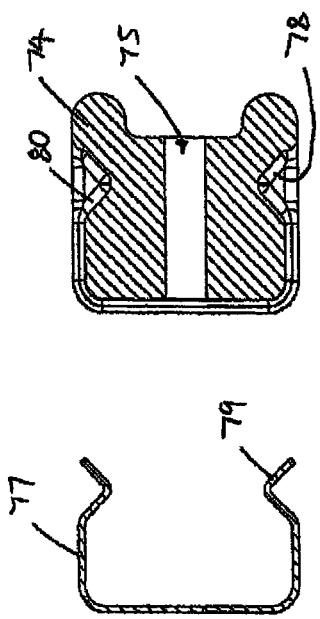
FIG. 15a is an exploded cross section of one of the locking devices.

One of the locking devices 71 is shown in more detail in FIG. 15. The device includes a block 74 with a through bore 75 for screw-threaded receipt of a pin 76. A resilient band 77 is fitted around a reduced dimension part 78 of the block 74 with arms 79 that clasp inwardly tapered ramps 80. The band 77 provides a bearing surface 81 for the pin 76. In operation, the key 73 is used to wind the pin 76 into the block 74 until the band 77 is engaged and forced away from the block 74, to cause the arms 79 to expand along the ramps 80. The expansion of the arms 79 forces the side members 56 apart so that the bearing surface 81 and band 77 to be pushed away from the block 74 and against a back surface of the coupling to thereby lock the couplings 25 together. The block 74 may alternatively be configured so that the band 77 is fitted at a 90° orientation to that shown in order for the outward movement of the arms 79 not to be impeded by the opposed walls of the associated side members 56

Figure 16:
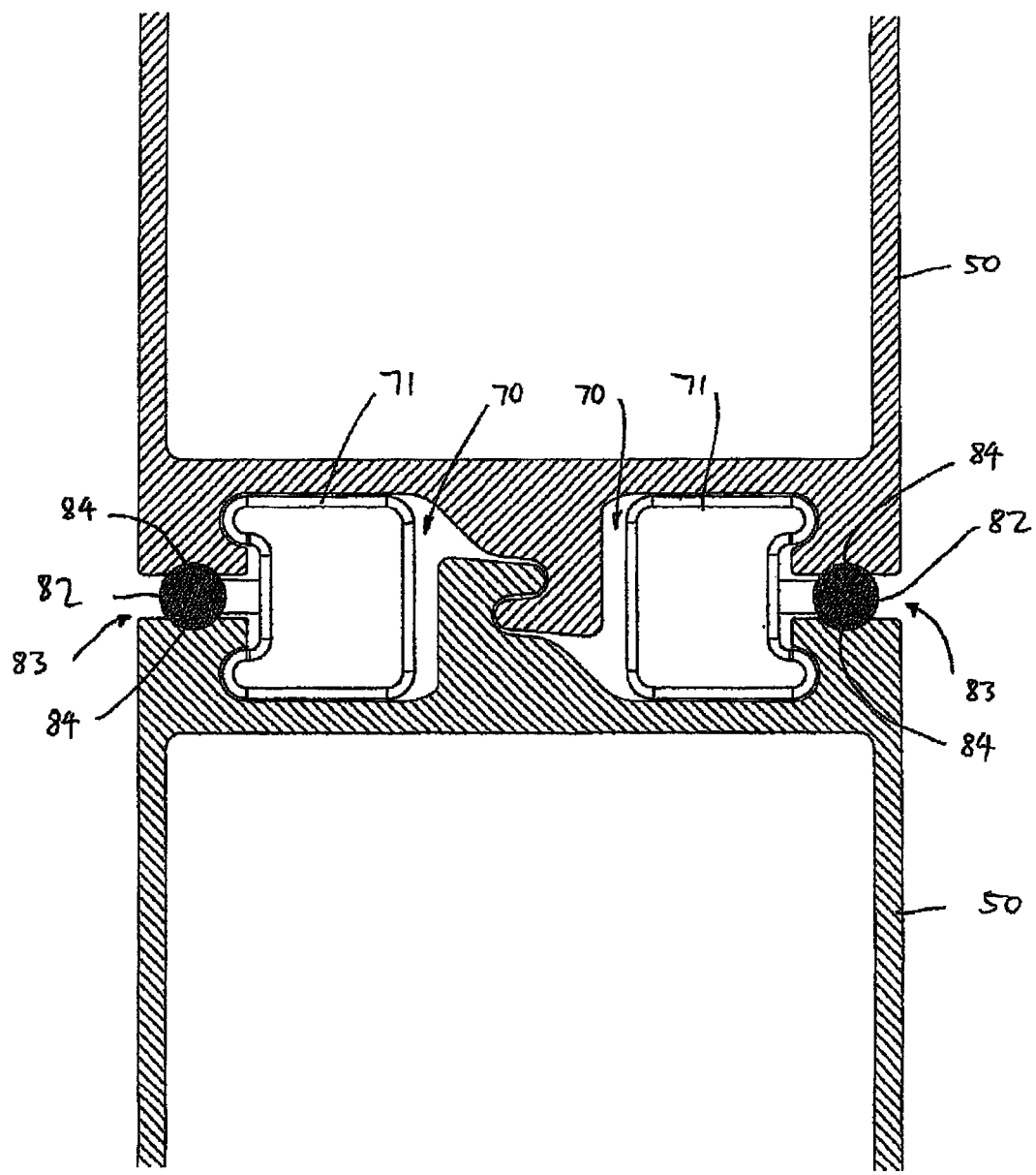
FIG. 16 illustrates the installed locking devices with sealing strips.

Referring to FIG. 16, once the locking devices 71 are in place, material strips 82 such a rubberised gaskets can be inserted in gap 83 with a purpose made tool and positioned in recesses 84, between the panels 50, in order to provide a weather seal. The gap 83 can also be utilised to mount fixtures to the panels by having the fixtures mounted through the gap 83 and in the voids 70. Such fixtures might include internal shelving or cabinet attachments, cladding, wall covering or external shade awnings. A picture fixing slot may also be provided at the top of the panel 50 to allow for picture hanging fixtures to be installed along the wall panels.

Figure 17:
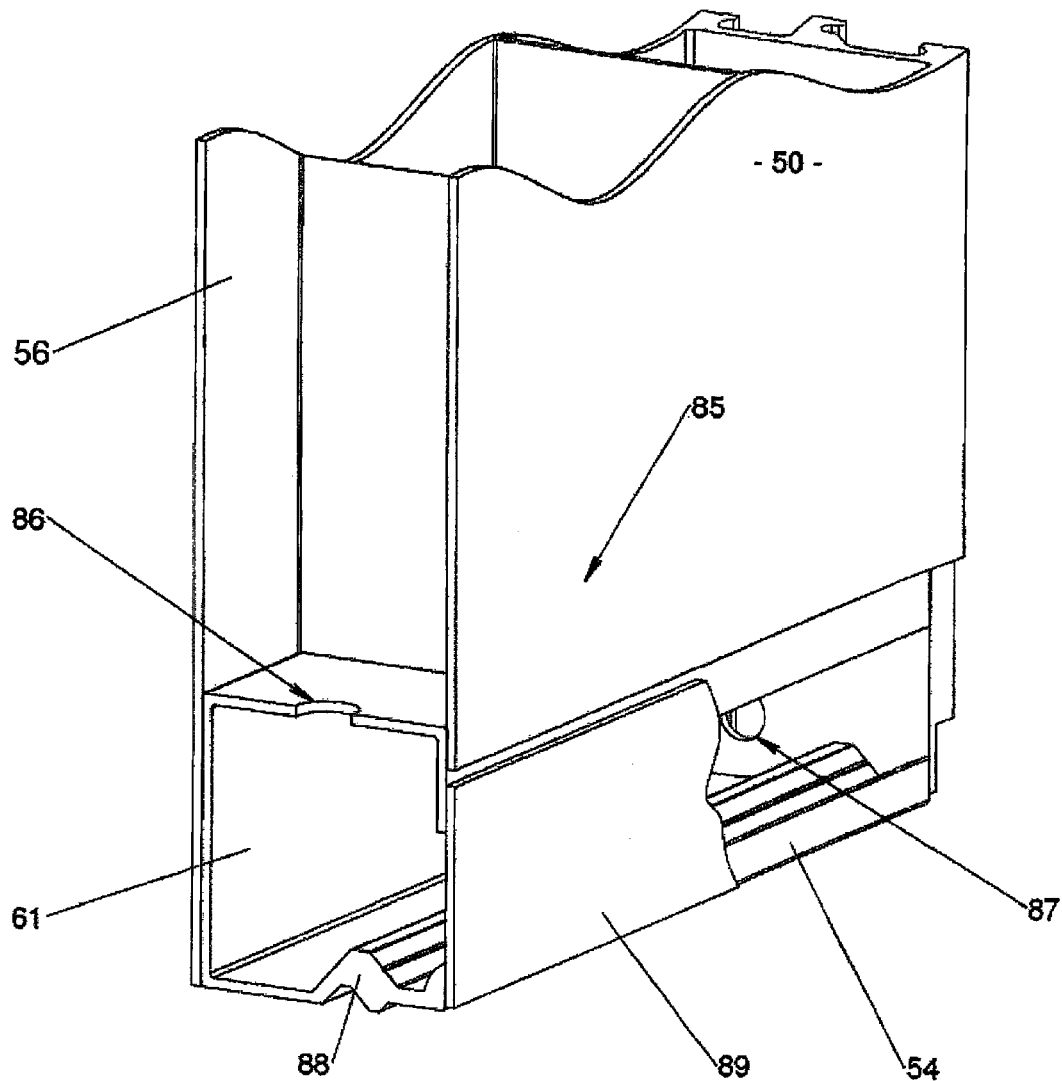
FIG. 17 is a partial sectional view of a base of the modular panel of FIG. 9.

With reference now to FIG. 17, a lower section 85 of the panel 50 is shown, with a skirting cover 89 in place. The side member 56 and channel 61 have respective openings 86, 87 to ensure conduits can pass freely around the perimeter of the panel 50. The footing 54 is also clearly shown as including a rib profile 88 that allows the panel 50 to locate in a predetermined position relative to the floor assembly 2 so as to be in alignment with posts 14.

Figure 18:
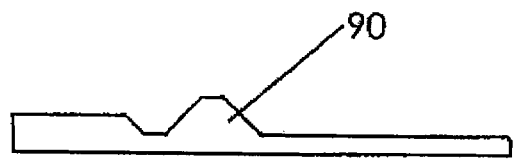
FIG. 18 is an end view of a ribbed floor plate.

FIG. 18 shows a ribbed floor plate 90 that has a corresponding profile. The floor plate 90 is in use positioned on the floor assembly 2 in line with the posts 14 to locate and align the panel 50. In order to connect the panel 50 to an adjacent structure such as one of the posts 14 or an adjacent panel 50, the panel 50 needs to be pivoted into place so that the coupling 25 can engage with a corresponding fixture of the post 14 or a corresponding hooked coupling 25 of the other panel 50. As the panel 50 is pivoted, the footing 54 rides up over the floor plate 90 and then drops into position when the profile of the floor plate 90 and footing 54 register with each other. The panel 50 can then be fixed to the floor assembly 2 by fixing screws through predrilled holes in the footing 54.

Figure 19B:
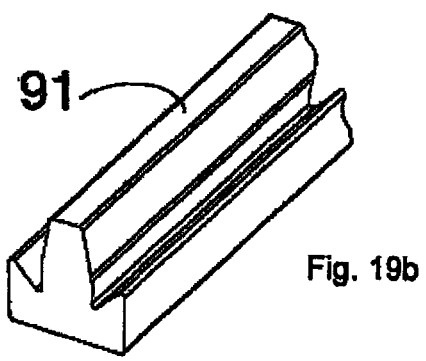
FIG. 19b is a perspective view of the strip.
Figure 19A:
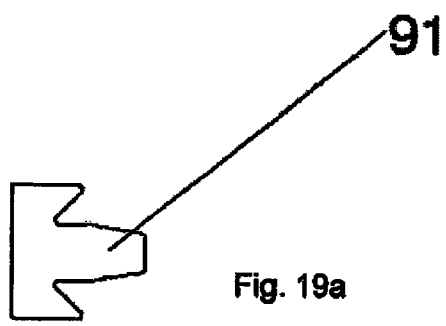
FIG. 19a is an end view of a strip.

As the panel 50 drops onto the floor plate 90, a space will be created at the top of the panel 50, between the beams 15 of the roof assembly 4 and the head 53 of the panel 50. This space may be filled with a pre-sized T-sectioned strip 91, such as shown in FIG. 19, which is secured in place using appropriate tensioning screws.

Figure 20:
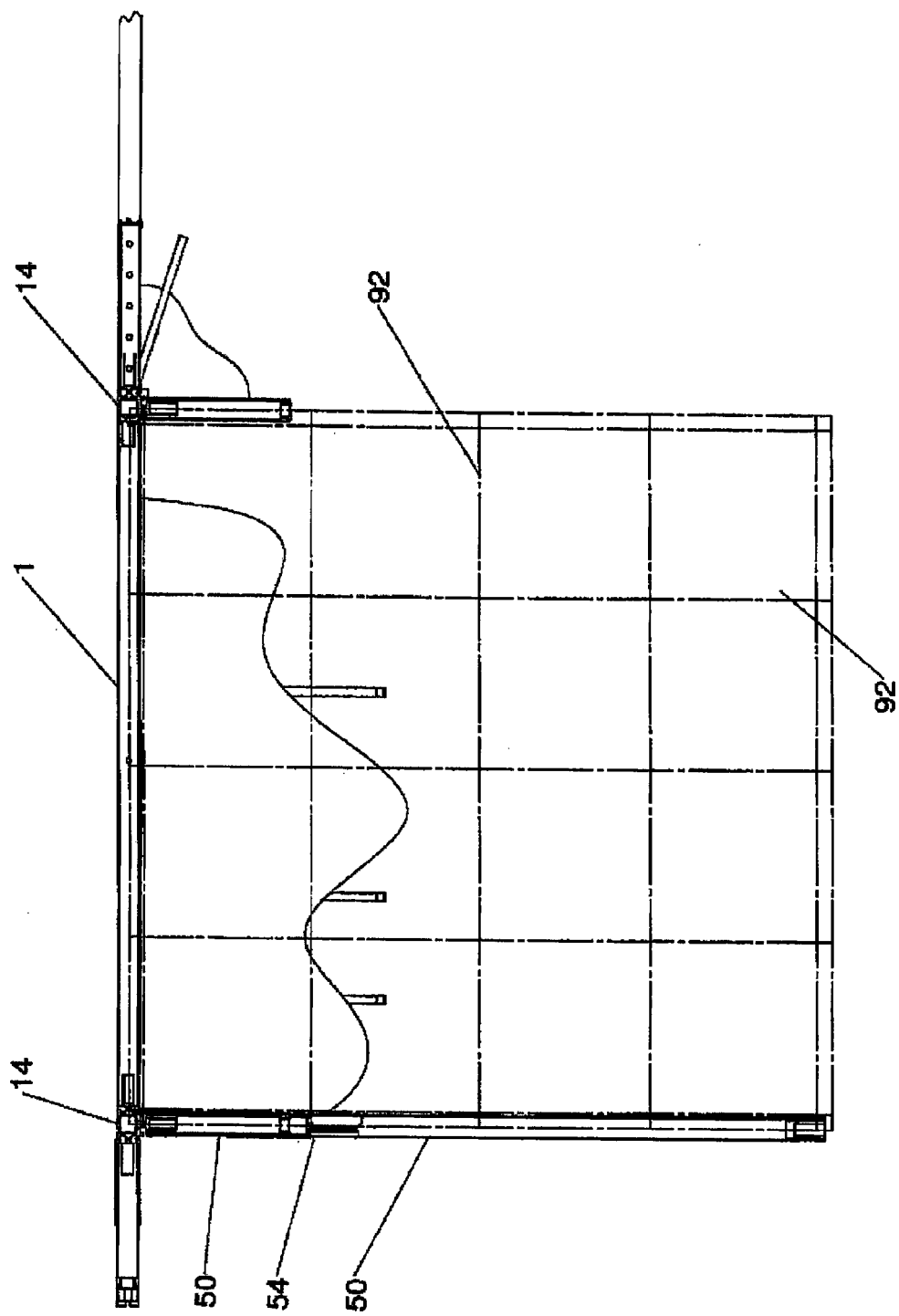
FIG. 20 is a plan view of another example of a building assembly.

Referring now to FIG. 20, the building system 1 is illustrated in plan view. The system 1 is divided into equal grid sections, as indicated by phantom lines 92. Each phantom line 92 indicates a position of the side member 54 of each of the panels 50. Accordingly, the entire system 1 is preferably in a grid like structure with each of the modular panels 50 being of a width substantially in the order of 1000 mm. As illustrated, the panels 50 within the grid are connected either directly to the posts 14 or to adjacent panels 50. Each panel 50 may be readily swapped out, as required, by removing the relevant locking devices 71 and pivoting the panel 50 out of line with the other panels, for removal.

Figure 21:
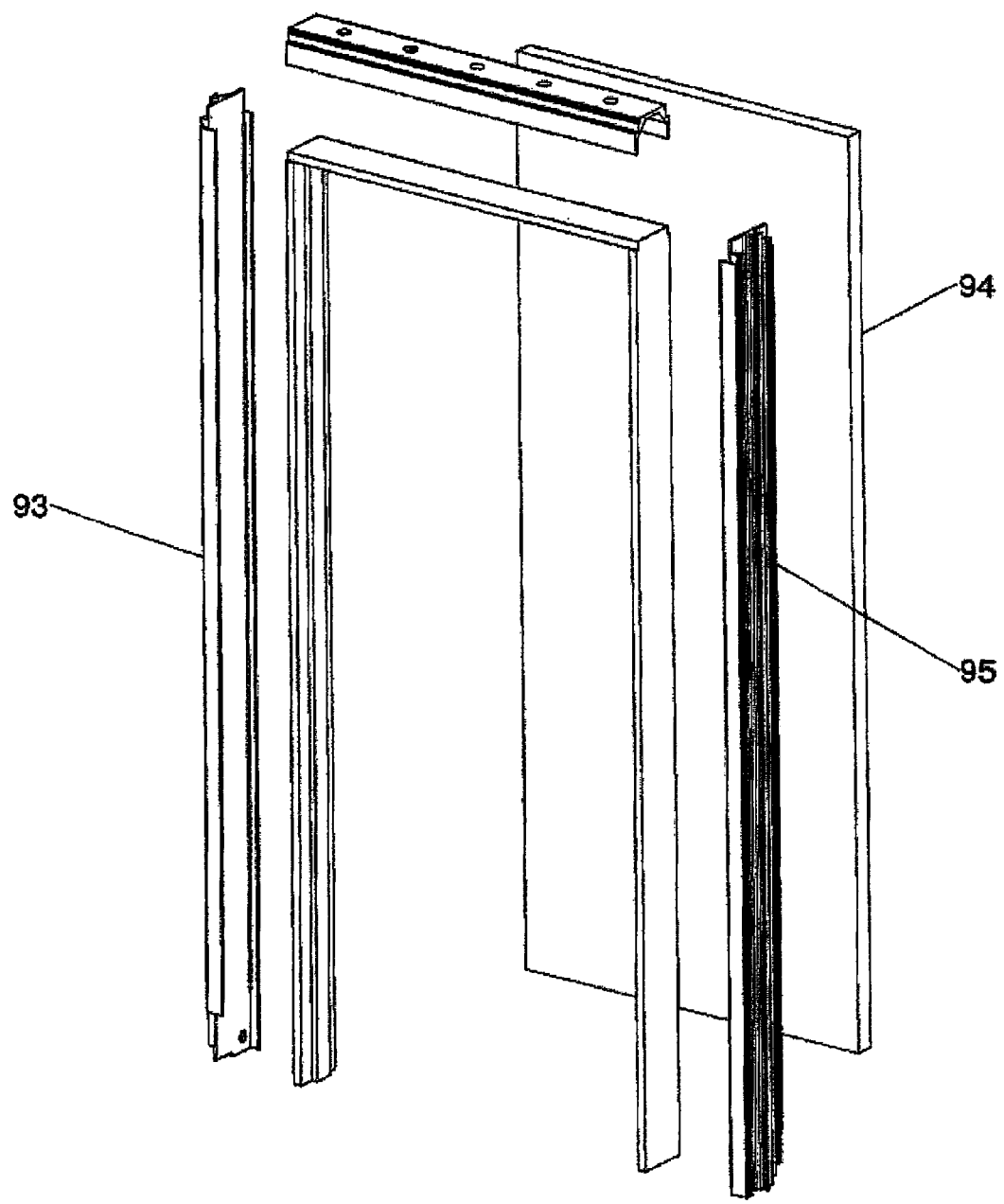
FIG. 21 is an exploded perspective view of a modular panel in the form of a door.
Figure 22:
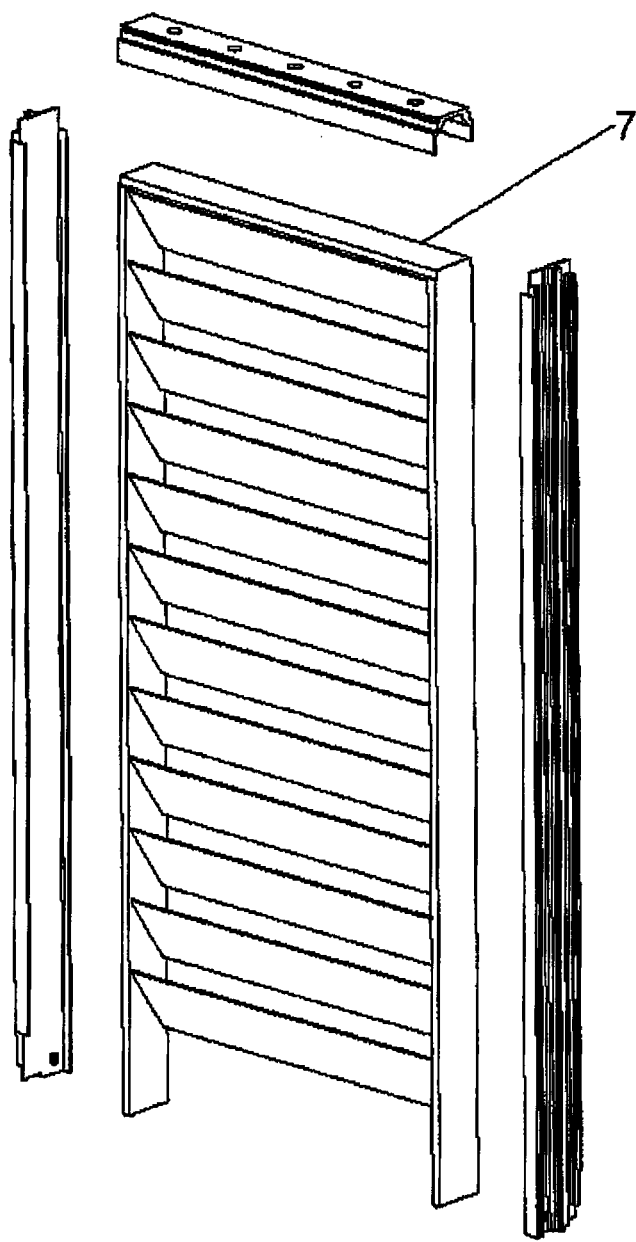
FIG. 22 is an exploded perspective view of a louvered modular panel.

The panel 50 described above carries a fully enclosed wall panel 5. However, other forms of panels may be fitted into the system 1, as required. For example, FIG. 21 illustrates a modular full length door panel 93 with a full height door 94 fitted into the frame 95, while FIG. 22 illustrates a louvered window panel 7. Alternatively, a panel assembly configuration (not shown) can be adopted that has a sliding door or a double door carried within a frame that takes the space of two of the above described modular panels 50 but is still suitable for connection with adjacent panels or posts.

In either case, it should be appreciated the system 1 comprises a range of manufactured and pre-finished building elements and modular components, in the form of the brackets, posts, bearers, beams and panel assemblies. These building elements may be custom made specifically for the described system 1 and building projects can be designed in a format which is compatible with the building elements.

The elements may be packaged into project lots and delivered to a building site. After completion of various site works including foundations and underground services, the building elements are assembled on site to create the designed building.

The assembly process involves connecting the pre-sized building elements together with proprietary connectors, fixtures and fittings and pre drilled holes.

On completion of the building process, electrical, communication, plumbing and drainage services are installed. Removable access panels and a series of integrated access ways and voids within the modular panels and beams allow this work to be performed after completion of the building.

More particularly, removable beam and void covers allow access to a complete network of interconnecting ducting, cableways and access voids so that complete electrical, communication and plumbing reticulation networks can be installed in on single visit after the building phase is completed without the necessity of numerous installation phases during the construction phase. Each beam is hollow with access holes cut into the webs of the beam. Through holes are cut into each post at beam level to allow cables or piping to pass through. As described above, the wall panels are formed with compartments that receive layers of insulation material from top to bottom. The compartments line up with access holes in the head of the panel and in the skirting footing. The compartments allow cable or conduits such as piping to pass through. This provides many options for running cabling to and along the ducted skirting for installation of power points or other outlets or connection points in the face of the ducted skirting. These compartments also allow for connection points anywhere on the face of the panel assembly, internal or external. This access also allows for ready modifications or additions to the services at any time, without damage to finished surfaces.

The design of the system allows removal and replacement of certain building elements and modular panels, facilitating expansion or reduction of buildings as well as re-configuration or disassembly and reuse of all or part of any building element.

Also, as many elements of the system as possible are designed to be made by a process of pultrusion, which means the elements can be manufactured cheaply and efficiently.

It should be appreciated then, that the construction system, particularly when applied to a building, realises advantages from the various elements being formed of standard composite pre-dimensioned, pre-drilled and pre-finished components. These components can be mass produced mostly using a pultrusion process. The components can be assembled in a vast number of different configurations and so produce a wide range of buildings of varying design and size both single and multi story, for a range of different usages.

The buildings can be assembled with a minimum amount of equipment and skilled labour. All connections are by bolt or screw into pre drilled holes or using proprietary fixings. No cutting or finishing is required in the assembly process. All services are fitted after construction is completed and can be modified at any stage. A wide range of cabinets and windows and doors can be incorporated into the system. Buildings can be re-configured or dissembled and reused repeatedly. Wall modules can be removed and re-configured without disturbing adjacent modules, posts or other building elements. All components are designed to be lightweight eliminating the need for heavy lifting equipment. All components can be containerized for inexpensive transport worldwide. Durable composite materials ensure extremely long lifespan. Manufacturing methods and single delivery of components to site ensures waste reduction, increased worker safety and reduced vehicle movements.

Although the invention has been described by reference to a building system, the modular panels also have application in any other form of construction where panels may be swapped out independently of adjacent panels.

The invention has been described by way of non-limiting example only and many modifications and variations may be made thereto without departing from the spirit and scope of the invention described.

LIST OF PARTS

1. Building assembly
2. Floor assembly
3. Modular panels
4. Roof assembly
5. Wall panels
6. Door panel
7. Window panel
8.
9.
10. Legs
11. Bearers
12. Joists
13. Floor surface
14. Posts
15. Beams
16. Roof
17.
18. Base
19.
20. Bracket
21. Fasteners
22. Holes
23. Blades
24. Bridging section
25. Coupling
26. Apertures
27. Opening
28. Holes
29.
30. Fixture
31. End 32. Top flange
33. Bottom flange
34. Cut out
35. Timber inserts
36. Fasteners
37. Attachments
38. Main plate
39. Cam plate
40. Curved surfaces
41. Flat surfaces
42. Flared profile
43. Upper end
44. Timber insert
45. Roof structure
46. Central void
47. Projections
48. Edges
49. Voids
50. Wall panel
51. Main body
52. Frame
53. Head
54. Skirting footing
55.
56. Side member
57. Inner shell
58. Outer shell
59. Openings
60. Openings
61. Channel
62. Void
63. Opening
64. Compartments
65. Insulation
66. Structure
67. Projection
68.
69.
70. Void
71. Locking devices
72. Expansion pieces
73. Key
74. Block
75. Bore
76. Pin
77. Band
78. Part
79. Arms
80. Ramps
81. Bearing surface
82. Strips
83. Gap
84. Recesses
85. Lower section
86. Openings
87. Openings
88. Rib profile
89. Cover
90. Floor plate
91. Strip
92. Phantom lines
93. Door panel
94. Door
95. Frame

The invention claimed is:

1. A building system that includes a modular panel and an adjacent structure, the modular panel having a side member with an associated coupling extending lengthwise of the side member for hooked connection with a corresponding shaped fixture of the adjacent structure, wherein the coupling and fixture project laterally of the side member and adjacent structure, respectively, so as to define voids either side of the coupling and fixture when assembled, the building system further including a connection system which is introduced into the voids and is operable through an elongate gap formed between the panel and the adjacent structure on either side of the panel, wherein the connection system comprises:

an expansion piece in each void, each expansion piece including a block with a base that has shoulders located in associated inward facing rebates formed in the respective side member and adjacent structure, either side of the associated gap, in order to loosely connect the modular panel and the adjacent structure together, wherein:

each expansion piece includes a pin and the block has a through bore for screw-threaded receipt of the pin and a resilient band fitted around the block to provide a bearing surface for the pin; and the pin is actuated by a tool inserted through the associated gap in order to engage and wind the pin into the block until the band is engaged and forced away from the block against the respective coupling or fixture to urge the coupling and fixture together, to lock the adjacent structure to the side member.

2. The building system of claim 1, wherein the panel includes a frame formed by the side member, a head, a second side member, and a footing, and wherein the coupling is configured to separate from the hooked connection with the fixture by action of pivoting the frame of the panel relative to the adjacent structure.

3. The building system of claim 1, wherein the panel includes a frame formed by the side member, a head, a second side member, and a footing, with a removable cover being fitted over a void in the footing, wherein the voids either side of the coupling and the void in the footing are interconnected by through holes to allow passage of a conduit such as a water pipe, or electrical cabling or the like.

4. The building system of claim 3, wherein the second side member is also provided with a coupling to allow the panel to connect with corresponding structure either side of the frame.

5. The building system of claim 4, wherein one of the side members is configured to define the elongate gap between the frame and adjacent structure to accommodate fittings arranged to project from the panel assembly.

6. The building system of claim 5, wherein the elongate gap is designed to receive a strip of material to seal the elongate gap when the expansion pieces are in place and engaged.

7. The building system of claim 6, wherein the system includes additional panels and multiple supporting posts, each additional panel having respective side members with associated couplings and being interconnected with a respective adjacent structure in the form of either an adjacent panel or an adjacent post, wherein the additional panels are adapted to be individually installed or removed independently of an adjacent panel or post.

8. The building system of claim 7, wherein the adjacent panels are a combination of one or more of a wall panel, a door panel, a window panel or a louver panel.

9. The building system of claim 1, wherein the panel is in the form of a wall panel formed with internal compartments for receipt of insulation material and/or conduits.

10. The building system of claim 1, further including a floor assembly and a roof assembly.

11. The building system of claim 1, further comprising:
a floor assembly formed of a series of legs interconnected with bearers, the ends of each bearer being coupled relative to an associated leg by a bracket that is fixed to a post base supported by the respective leg, wherein:
the bearers are formed with an open box section and each bracket has a coupling for hooked connection with a complementary fixture of the post base;
the bearers have a cut-away at each end that allows the bearer to be lowered over the associated bracket in a position suitable for pre-formed holes in the bearer and bracket to register, for receipt of fasteners;
the floor assembly further includes a series of joists extending between two of the bearers, an end of each joist being connected to the respective bearer by an end attachment, wherein the end attachment includes a cam plate that is installed by being rotated into the box section of the bearer until the plate is locked to the bearer, behind a top and bottom flange of the open box section; and wherein
each cam plate allows for single direction rotation for installation, to then lock against further rotation and the cam plates at each end of the associated joist act against each other whereby to secure the joist against accidental unlocking rotation.

12. The building system of claim 11, wherein the bearers have a timber insert fitted to a top of the open box section.

13. The building system of claim 12, wherein the end attachments are fixed to the timber insert by fasteners.

14. The building system of claim 13, further including a floor surface that is mounted on top of the joists and bearers and secured to the timber inserts.

15. The building system of claim 1, further comprising a roof assembly including a series of posts interconnected with beams, the ends of each beam being attached to an associated post by a bracket that is fixed to the respective post, wherein the beams are formed with an open box structure to receive conduits and each bracket is formed with an opening in communication with an aligned aperture in the associated post to allow the conduits or the like to pass between the box section and an interior of the column.

16. The building system of claim 15, wherein each bracket has a bracket coupling for hooked connection with a complementary fixture of the column.

17. The building system of claim 15, wherein the beams have a cut-away at each end that allows the beams to be lowered over the associated bracket in a position suitable for pre-formed holes in the beam and brackets to register, for receipt of fasteners.

18. The building system of claim 15, wherein the beams have a timber insert fitted to a top of the open box section.

19. The building system of claim 15, further including a roof structure mounted on top of the beams.

* * * * *